United States Patent
Hebbecker

(10) Patent No.: US 6,693,544 B1
(45) Date of Patent: Feb. 17, 2004

(54) ELECTRONIC IDENTIFICATION TAG

(75) Inventor: Werner Hebbecker, Nuremberg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/762,041

(22) PCT Filed: Jul. 5, 1999

(86) PCT No.: PCT/EP99/04658

§ 371 (c)(1),
(2), (4) Date: Jan. 31, 2001

(87) PCT Pub. No.: WO00/08597

PCT Pub. Date: Feb. 17, 2000

(30) Foreign Application Priority Data

Jul. 31, 1998 (DE) .......................... 198 34 515

(51) Int. Cl.$^7$ ............................... G08B 23/00
(52) U.S. Cl. .................. 340/573.1; 235/487; 283/75
(58) Field of Search ............... 340/573.1, 5.2, 340/5.8; 235/375, 380, 487; 705/2, 3; 283/72, 74–78; 40/625

(56) References Cited

U.S. PATENT DOCUMENTS

| | | | | |
|---|---|---|---|---|
| 4,236,332 A | * | 12/1980 | Domo | 283/76 |
| 4,896,027 A | * | 1/1990 | Drexler | 235/487 X |
| 5,191,608 A | | 3/1993 | Geronimi | 713/187 |
| 5,276,435 A | * | 1/1994 | Rossides | 340/5.32 X |
| 5,452,431 A | | 9/1995 | Bournas | 711/115 |
| 5,570,081 A | * | 10/1996 | Holstrom | 283/74 X |
| 5,912,981 A | * | 6/1999 | Hansmire et al. | 382/116 |
| 6,042,005 A | * | 3/2000 | Basile et al. | 235/380 X |
| 6,050,605 A | * | 4/2000 | Mikelionis et al. | 283/76 |
| 6,140,936 A | * | 10/2000 | Armstrong | 340/5.74 |

FOREIGN PATENT DOCUMENTS

| | | |
|---|---|---|
| DE | 295 19 644 | 4/1997 |
| FR | 2 753 291 | 3/1998 |
| GB | 2 203 699 | 10/1998 |

* cited by examiner

*Primary Examiner*—Thomas Mullen
(74) *Attorney, Agent, or Firm*—Kenyon & Kenyon

(57) ABSTRACT

An electronic identification tag or card is indicated, which may be equipped with a rupture joint that has a vertical, diagonal, undulated, zigzag, meander-shaped or other type of design or pattern. The electronic identification tag or card may have two sections which may have a mirror-inverted design, and, in which, the same data may stored in the same manner. Integrated, embedded, or implanted memory or microprocessor chips may have the same structure, and one section of the identification tag or card is provided with punched holes for a necklace. Moreover, visually readable data, such as a personal identification number (PKZ), blood type (A Rh+), a nation and name (NN), may be introduced into is both sections. The electronic identification tag or card can be made of a very resistant plastic, glass, ceramic, or a similar material, the particular data carrier or memory device being embedded with or without intelligence in the form of a chip, magnetic strip or hologram. The identification tag or card is equipped to be able to be connected via contacts or on a wireless basis to a data processing system or contactless read devices. The memory or microprocessor structure permits a very flexible directory structure. Thus, in the main memory directory, for example, one can store global card data, such as personal identification numbers (PKZ), nation, name (NN), and blood type (A Rh+). Moreover, in the data fields of the main directory, one can store access authorizations, and, in the subdirectories, for example, the training or special skills of a person wearing this tag.

14 Claims, 3 Drawing Sheets

ELECTRONIC IDENTIFICATION TAG

FIELD OF THE INVENTION

The present invention relates to an electronic identification tag for people.

BACKGROUND OF THE INVENTION

Identification tags for people are available. For example, soldiers and members of similar organizations, such as the militia, gendarmerie, border patrol, national guard, conscripted militia, wear such identification tags constantly, i.e., day and night. Identification tags are data carriers having data that is specific to the particular person. Soldiers, in particular, carry identification tags. At the present time, those tags are made of sheet metal having two symmetrical halves that are separable by a predefined rupture groove. The tag can be worn on a chain around the neck. One's nationality, personal identification number, and blood type are engraved as data into each of the two halves. In the event of death, one half is broken off and is used to identify the person in question; the other half remains on the body. The basis for the material selection and the long-lasting debossing of the data is that, should the need arise, the identification tag must be able to provide information about the particular person, even under the harshest conditions and, for example, after years in the corrosive ground.

The data stored on such a conventional identification tag no longer can meet the needs of a modern, hi-tech army. In all modern armed forces, the soldier, e.g., the infantryman or the rifleman, is increasingly considered to be part of a weapons system or even as an independent weapons system. This may be evidenced by his ability, acquired from special training and equipment, to act and survive independently, and in the individual case, even for a long period of time. Information on an individual soldier's training, for example, parachute training, specific competencies, such as driver's license, knowledge, medical dispositions, such as vaccinations and allergies, are usually available in a decentralized location in various paper data files, and cannot always be readily retrieved in critical situations. However, it is precisely the requirements for rapid troop deployment, such as of the so-called crisis reaction forces of the armed forces, which necessitate making such data immediately available on site.

Nowadays, plastic cards have also become established as data carriers, and may be used as identification cards, health insurance cards, or as credit cards, either with or without chips, and with or without contacts. Such a card is described, for example, in the German Patent Application No. 196 48 767 A1. The cards themselves are made of plastic and are used in various designs as data carriers, the data essentially being stored in a visually non-readable form on magnetic strips, optically encoded in the form of a hologram, or in a chip. In addition, visually readable data, such as relief embossing, debossing, laser-based labeling, or bar codes may be applied to such data carriers. In the case of the chip cards, so-called memory chip cards and smart cards are used, the latter also being equipped with a microprocessor or with programmable logic arrays. Data stored on cards of this kind may be used for many purposes. For example, they may be used to identify someone as an authorized user to a system and to grant him access to this system. Examples of this are phone cards, credit cards, access cards to smart master-key systems, or health insurance cards. Particularly in the last two cases, personal data are written into the card's memory. Cards of this kind having magnetic, optical, or chip-supported memories/processors are described, for example, in "Archiv für das Post-und Fernmeldewesen", 42nd volume, 3rd issue, August 1990, or in "Der Fernmeldeingenieur", 43rd volume, issue 8/9, August/September 1989.

The available memory or microprocessor chip cards may, in fact, be able to store a great deal of data. However, they may not be suited as electronic identification tags for people having combatant status.

SUMMARY OF THE INVENTION

Exemplary embodiments and/or exemplary methods according to the present invention are directed to devising an electronic identification tag for people having combatant status, which will meet the requirements of the military, militia, gendarmerie, border patrol, national guard, mountain rescue service, and the like, and which, moreover, will render possible a modern data acquisition and transmission, as is prevalent in present-day chip and microprocessor cards.

Further exemplary embodiments and/or exemplary methods according to the present invention are directed to providing an electronic identification tag for people having combatant status which is designed either in a chip card form or identification tag form and is made up of two parts that can be separated by a rupture joint or point of break. In this context, the rupture joint can be configured in a horizontal, vertical, diagonal form or in a meander or undulated shape. Other designs, such as a zigzag shape, are also possible. The identification card or tag itself can either be made of a very resistant plastic, glass, ceramic, or the like, the particular data carrier or memory device being embedded with or without intelligence in the form of a chip, magnetic strip or hologram. All relevant personal data may be stored on both sections or sides. In a further exemplary embodiment and/or method, this can be done by equipping only one section or one side of the identification card or tag with a chip, and not the other. This means that, on the other side, all relevant personal data may be electronically stored and, at least on the other side, all data are applied again so as to be visually perceptible. With respect to durability and resistance to external influences, exemplary embodiments and/or exemplary methods according to the present invention of the identification card or tag may be designed to satisfy the requirements of an identification tag, the special environmental and field conditions and demands placed on the group of people and the field conditions being considered.

In exemplary embodiments and/or exemplary methods according to the present invention, the memory or microprocessor chip structure or hierarchy of the identification card or tag permits a very flexible directory structure, so that global card data, such as personal identification number, nation, name, blood type, can be stored in the main directory, for example. In further exemplary embodiments and/or exemplary methods according to the present invention, in data fields of the main directory, for example, one can then store access authorizations, and training or special qualifications in a subdirectory, for example. The data fields of the subdirectories, in turn, can include special, specific applications. Specific data or information, thus, for example, the log-on or start procedure and the transfer protocol can be stored in a ROM, and the application data fields can be stored in an EEPROM, which can also include a section for accommodating the security procedure(s). In further exemplary embodiments and/or exemplary methods according to the present invention, the data can be written or read in contactless fashion. Thus, the wearer of such an identification tag can be sensed in contactless fashion by a suitable detecting device. This may be useful, for example, in the event when weapons injure many people, and there is a need to organize medical provisions.

DETAILED DESCRIPTION

Figure 1:
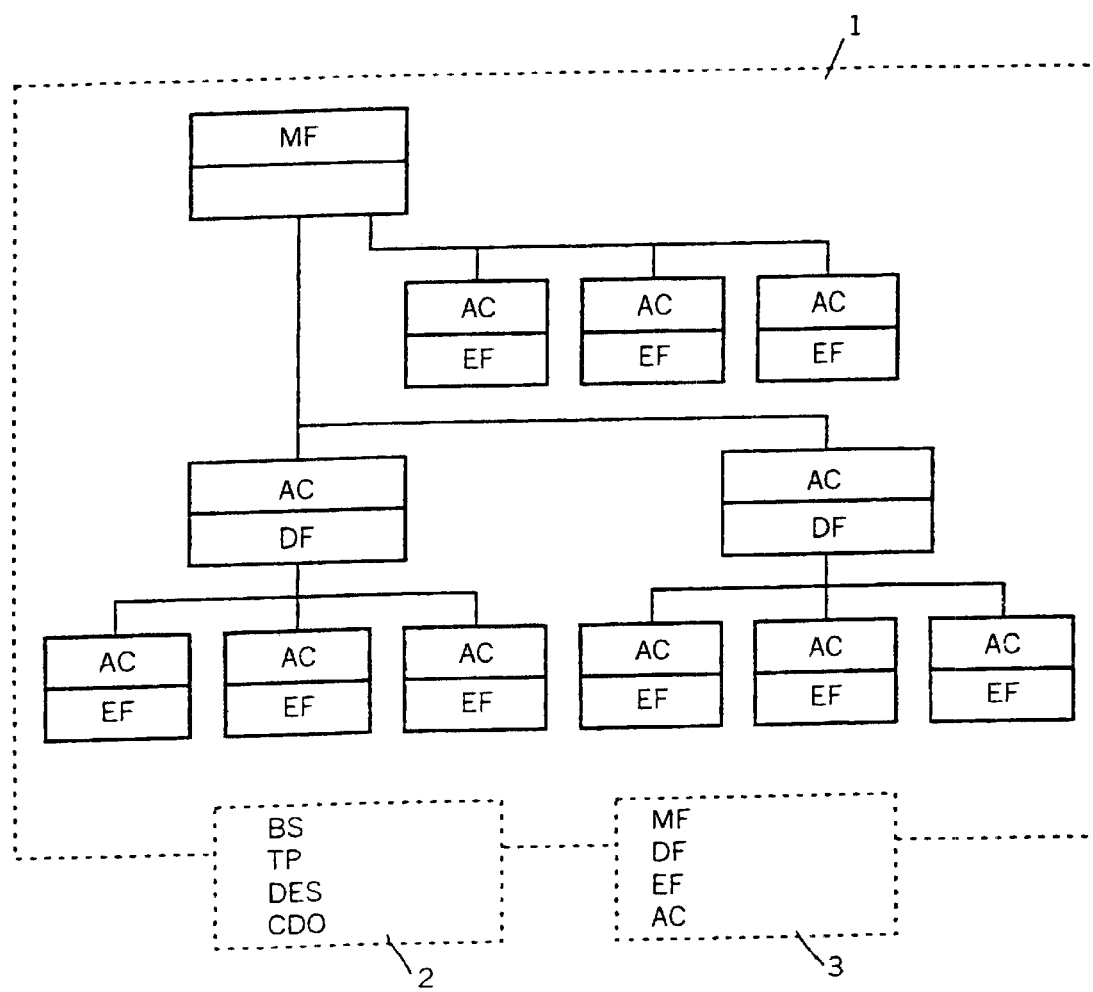
FIG. 1 shows an embodiment of a directory structure of an identification card or tag according to the present invention.

FIG. 1 shows a main directory structure of an embodiment of the identification card or tag of the present invention, surrounded by a dotted line 1.

The main directory MF includes global card data, such as personal identification number, nation, name and blood type. Completely different data can, of course, also be stored in the main directory for other applications or purposes. The main directory may be connected to subdirectories DF, for example, to the left, for storing the training of the person and, to the right, for storing special qualifications of this person. It may be linked to special data fields of the main directory MF, for example, access authorizations or conditions (AC). The subdirectories DF, in turn, may be linked via specific access conditions AC to specific data fields and memory areas for applications.

For purposes of control and transfer, an operating system, a transport protocol TP, a security system DES and, for example, commands CDO are provided in a memory 2, which may be designed only as a read-only memory. Moreover, the application area having main directory MF, subdirectories DF, data fields EF, and access conditions AC, is located in a read/write memory 3, for example, an EEPROM. The data to be stored may pertain not only to the personal identification number PKZ, etc., but also to other personal data, such as specialized skills, training, qualifications, medical status, etc. They can include images (a photo of the person) or biometric signatures, such as DNA.

Figure 2A:
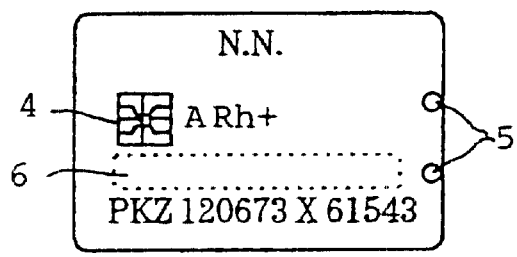
FIG. 2a shows an embodiment of the identification card or tag according to the present invention.
Figure 2B:
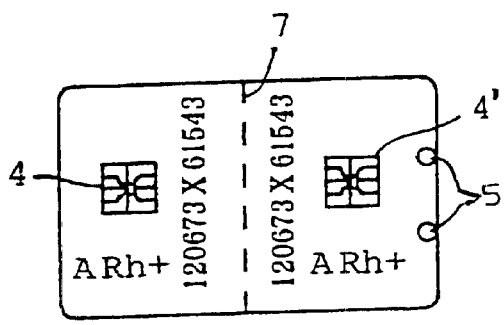
FIG. 2b shows an embodiment of the identification card or tag according to the present invention.
Figure 2D:
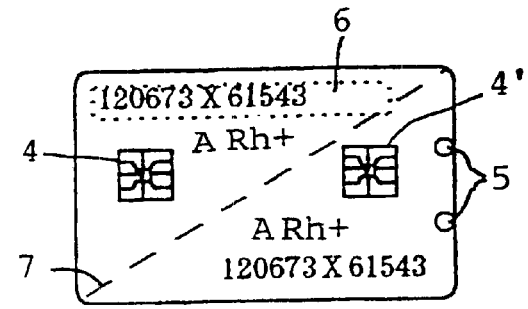
FIG. 2d shows an embodiment of the identification card or tag according to the present invention.
Figure 2C:
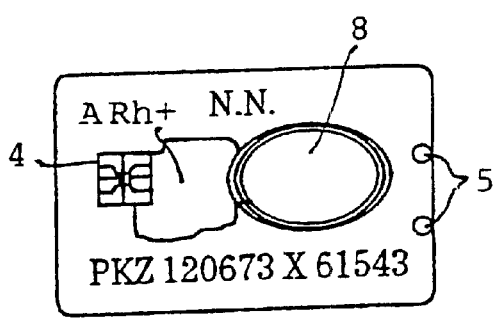
FIG. 2c shows an embodiment of the identification card or tag according to the present invention.
Figure 2E:
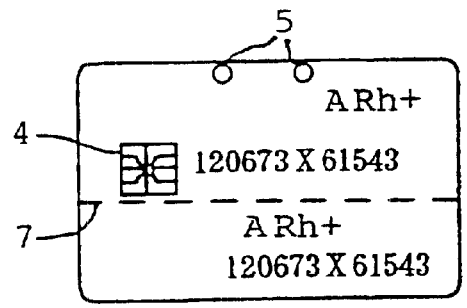
FIG. 2e shows an embodiment of the identification card or tag according to the present invention.
Figure 3:
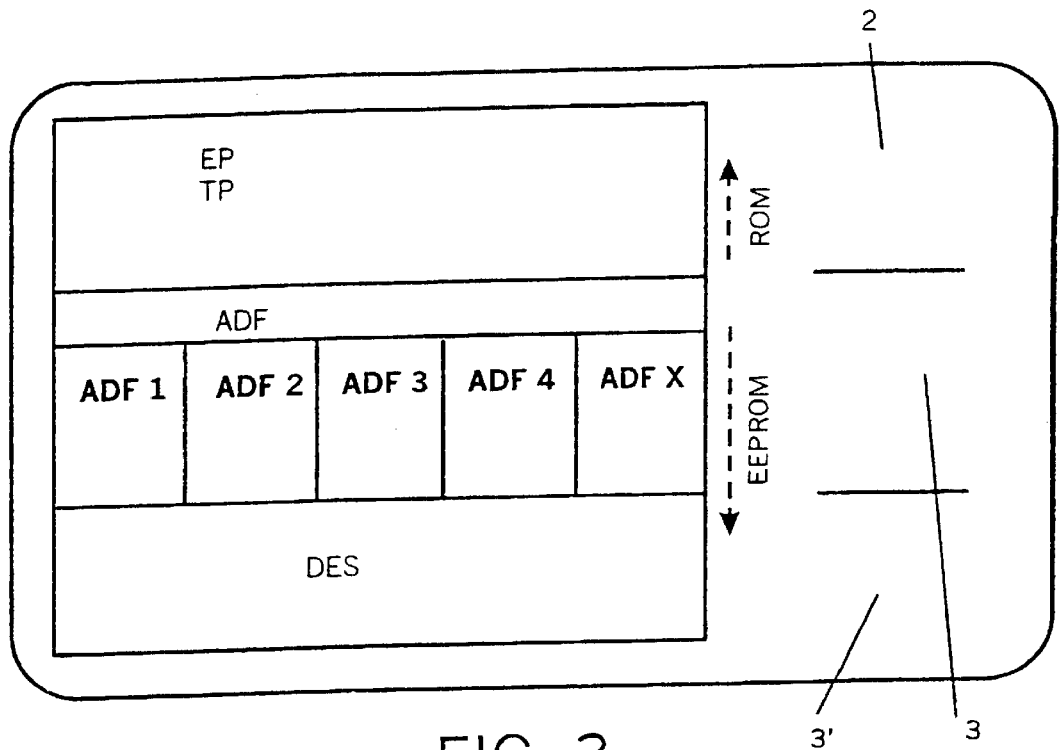
FIG. 3 shows a functional set-up of an embodiment of the electronic identification tag or card according to the present invention.

Various specific embodiments of the electronic identification tags or cards are illustrated in FIGS. 2a–3. FIG. 2a shows an identification tag or card having a chip 4, in which blood type A Rh+ is stored, for example. Moreover, the card can have two punched holes 5 for securing a necklace (not shown) and an optically encodeable strip 6 on the front/rear side. The personal identification number is introduced so as to be machine-readable into the optically or magnetically encodeable strip 6 on the front/rear side and so as to be readable on the card through a visually readable relief embossing or debossing, or by laser. This enables the name and the nation, for example, to also be applied to the card in indestructible fashion.

FIG. 2b shows an identification tag having a vertically running rupture joint 7 (or point of break). The two sections of the identification tag shown here have a mirror-inverted design and also have the same data stored in the same manner. The integrated or embedded memory or microprocessor chips 4 or 4' contain the same stored data and exhibit the same structure. One section of the identification tag, in turn, is provided with punched holes for a necklace. The personal identification number PKZ, the blood type A Rh+, the name and the nation NN, for example, can be visually readable.

FIG. 2c, in turn, depicts an identification tag, which, besides memory chip 4 and punched holes 5, also has an antenna 8 for contactless writing or reading or for transmitting special calls. The name, the nation NN, and the personal identification number PKZ, as well as the blood type A Rh+ are introduced, in turn, by visually readable relief embossing or debossing, or, indestructibly, by laser.

FIG. 2d shows an identification-card tag having a diagonally running rupture joint 7, both sections again being equipped with identical chips 4 or 4'. Again, both sections have visually readable data, such as name, nation NN, personal identification number PKZ and blood type A Rh+. One side has, on the rear, an optically or magnetically encodeable strip, in which, for example, the personal identification number PKZ can be stored so as to be machine-readable.

FIG. 2e shows an identification tag having a horizontally running rupture joint 7. In this variant, only one section of the identification tag has a memory or processor chip 4. On the other side, either a portion or all of the data and information stored in the memory or microprocessor chip are introduced so as to be visually readable.

It is noted at this point that the exemplary embodiments for identification tags shown in FIGS. 2a–e only include certain specific embodiments according to the present invention. One can easily conceive of any modifications to and/or combinations of the depicted exemplary embodiments, such as mounting an antenna 8 and a possibly necessary transmitter or receiver on one side of an identification tag that is equipped with a rupture joint 7 (or point of break).

FIG. 3 depicts the functional design of the electronic identification tag or card.

Stored in the tag or card is a log-on or start procedure EP, a transfer protocol or transport protocol TP in a read-only memory ROM 2. This section of the electronic identification tag is the general section, while the application data fields ADF are located in the application section including the exemplary applications of a read/write memory 3, which can be designed as an EEPROM. For this purpose, a plurality of application fields ADF1 through ADFX may be provided. The read/write memory also has a section 3' for accommodating the security procedure(s) DES; this section is the security area of the identification tag.

The functional design of the electronic identification tag or card shown in FIG. 3 can be provided on a duplicate basis when this tag or card, as in most cases, is provided with a rupture joint 7 (or point of break), and two identical sections of an identification tag or card are present.

Figure 4:
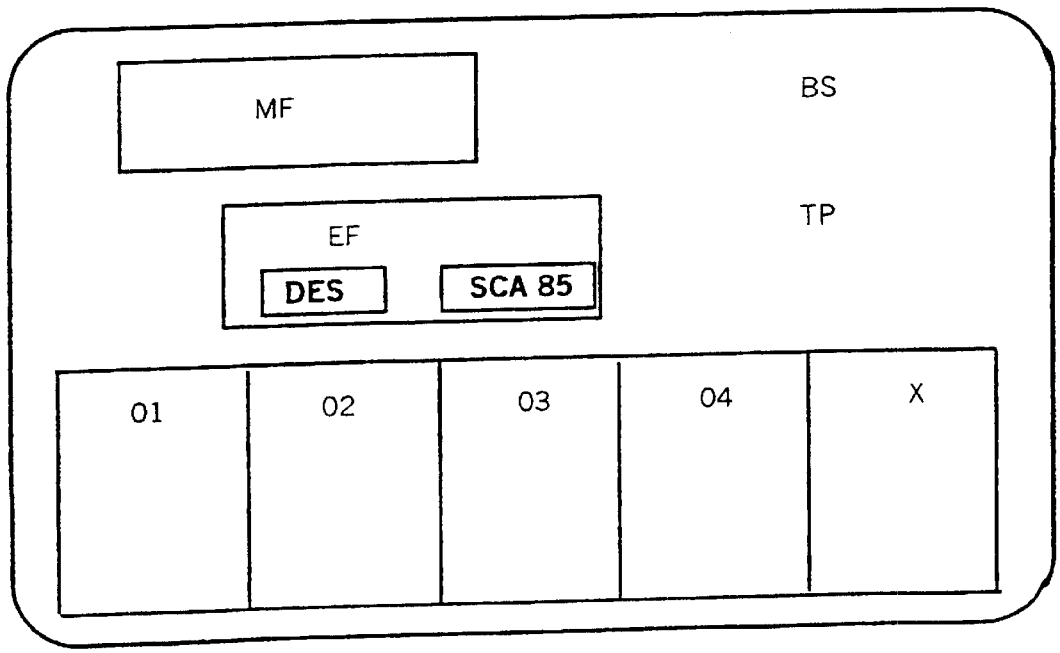
FIG. 4 shows a memory structure of an embodiment of the electronic identification tag or card according to the present invention.

FIG. 4 illustrates a main memory structure of the electronic identification tag or card. It includes a memory area for master file MF, the chip-card operating system, as well as uniform communications protocols. Provision can be made, moreover, for a memory area for elementary data fields EF, and for an additional memory field for security systemDES or procedures SCA85. Also provided are memory areas 01 through 05, or more, which are assigned to specific applications. Thus, for example, memory area 01 can be assigned to training, memory area 02 to access conditions, memory area 03 to medical data, memory area 04 to variable data, and memory area 05 to specialized skills.

The data stored in the identification tag or card under consideration can be read by card readers, in the available manner with the use of contacts; the data are alterable and can be rewritten using a suitable device into the memory in question when desired. Portions of the data can be stored in memory areas, as described, which are only readable and, thus, unalterable after being written the first time. They are suited, for example, for the personal identification number PKZ and blood type A Rh+, as shown, for example, in FIG. 1.

In view of special environmental conditions and demands on the group of people under consideration, the design of memory or microprocessor chip 4 in one specific embodiment is such that the data can also be written and read contactlessly. Thus, the person wearing such an identification tag or card can be detected in a contact-free manner using a suitable detecting device, and, for example, be counted. This may be useful, for example, when many people are injured and medical provisions need to be organized. The present invention can be implemented using just one card, where all the data or selected data can be read off visually, and/or where the data carrier is optically or magnetically encoded. In addition, another variant provides for the identification tag or card to have a rupture joint or point of break, and the data carrier or memory (chip, magnetic strip, hologram) to be located on only one or on both sections of the card. The material for the identification tag or card may be very resistant to external influences and, therefore, be made of resistant plastic, ceramic, or of special glass, for example, laminated glass. For search and rescue purposes, the electronic identification tag or card can also be equipped with a transmitter for radio, visual or audible tracking, for example, by producing a specific tone in the audible or inaudible range.

What is claimed is:

1. An electronic identification apparatus for persons having combatant status, comprising:
    at least one of an electronic identification tag and an electronic identification card, the at least one of the electronic identification tag and the electronic identification card being made of a first part and a second part of resistant material, the resistant material being resistant to an external influence, the first and second parts being separable from each other at a rupture joint, the first part having a first front side and a first back side, the second part having a second front side and a second back side, at least one of the first and second parts having a punched necklace hole; and
    at least one of an electronic memory chip, a microprocessor chip and a logic chip configured to store at least non-visual data, at least one of the first part and the second part including the at least one of the electronic memory chip, the microprocessor chip and the logic chip, an at least partial amount of the non-visual data stored on the at least one of the electronic memory chip, the microprocessor chip and the logic chip being made visually readable on at least one of the first part and the second part.

2. The apparatus as recited in claim 1, wherein the at least non-visual data stored on the at least one of the electronic memory chip, the microprocessor chip and the logic chip is configured to be at least one of read contactlessly, written contactlessly, read via a contact on the at least one of the electronic identification tag and the electronic identification card, written via the contact on the at least one of the electronic identification tag and the electronic identification card, read via a contact on the at least one of the electronic memory chip, the microprocessor chip and the logic chip and written on the at least one of the electronic memory chip, the microprocessor chip and the logic chip.

3. The apparatus as recited in claim 2, further comprising an antenna mounted on at least one of the first and second parts for at least one of contactless reading, erasing and writing.

4. The apparatus as recited in claim 3, further comprising a transmitter and a receiver on at least one of the first and second parts for transmitting and receiving data.

5. The apparatus as recited in claim 1, wherein the rupture joint is configured in at least one of vertical shape, horizontal shape, diagonal shape, undulated shape, zigzag shape and meander shape.

6. The apparatus as recited in claim 1, wherein the at least partial amount of the non-visual data stored on the at least one of the electronic memory chip, the microprocessor chip and the logic chip being made visually readable as at least one of machine-readable relief embossing, machine-readable relief debossing and laser-based labeling, on at least one of the first front side, the first back side, the second front side and the second back side.

7. The apparatus as recited in claim 1, wherein the first part has a first design, the second part has a second design, the second design being a mirror-inversion of the first design, the first and second parts including at least one of identically structured memory and identically structured microprocessor chips.

8. The apparatus as recited in claim 1, wherein the at least one of the electronic identification tag and the electronic identification card is made from at least one of resistant plastic, glass, and ceramic; and further comprising one of a data carrier and a memory device for storing the non-visual data, the one of the data carrier and the memory device being one of embedded, integrated and implanted in at least one of the first part and the second part via one of the at least one of the electronic memory chip, the microprocessor chip and the logic chip, an optically encodeable strip, a magnetically encodeable strip and a hologram.

9. The apparatus as recited in claim 1, further comprising a main directory for storing at least one of global card data, personal identification number, nation information, name information and blood type information, the main directory being situated on at least one of the first part and the second part, the main directory having a subdirectory to store at least one of a specialized skill and individual training data, the main directory having a special data field to control an access condition, of the main directory, the subdirectory being linked via the access condition to at least one of the special data field and to additional memory areas for applications.

10. The apparatus as recited in claim 1, further comprising an operating system, a transport protocol, and one of a security system and a security procedure, for control and transfer, stored in a memory ROM, the memory ROM being associated with the at least one of the electronic memory chip, the microprocessor chip and the logic chip; and further comprising an application area including a main memory directory, a subdirectory, a data field, and an access condition, the application area being stored in one of a read/write memory and an EEPROM, the one of the read/write memory and the EEPROM being associated with the at least one of the electronic memory chip, the microprocessor chip and the logic chip.

11. The apparatus as recited in claim 10, wherein the read/write memory includes memory areas assigned to specific applications.

12. The apparatus as recited in claim 1, further comprising at least one of a data field, an application area and a subdirectory, associated with the at least one of the electronic memory chip, the microprocessor chip and the logic chip, each of the at least one of the data field, the application area and the subdirectory having access conditions and being configured to be at least one of read via contacts, read contactlessly, erased via contacts, erased contactlessly, transcribed via contacts and transcribed contactlessly and being configured to store the non-visual data.

13. The apparatus as recited in claim 1, wherein the resistant material is at least one of plastic, ceramic, and glass.

14. The apparatus as recited in claim 1, wherein the resistant material is laminated glass.

* * * * *